Dec. 22, 1931.  L. M. GREEN ET AL  1,837,659
TRACTOR GUIDE
Filed July 12, 1930    2 Sheets-Sheet 1
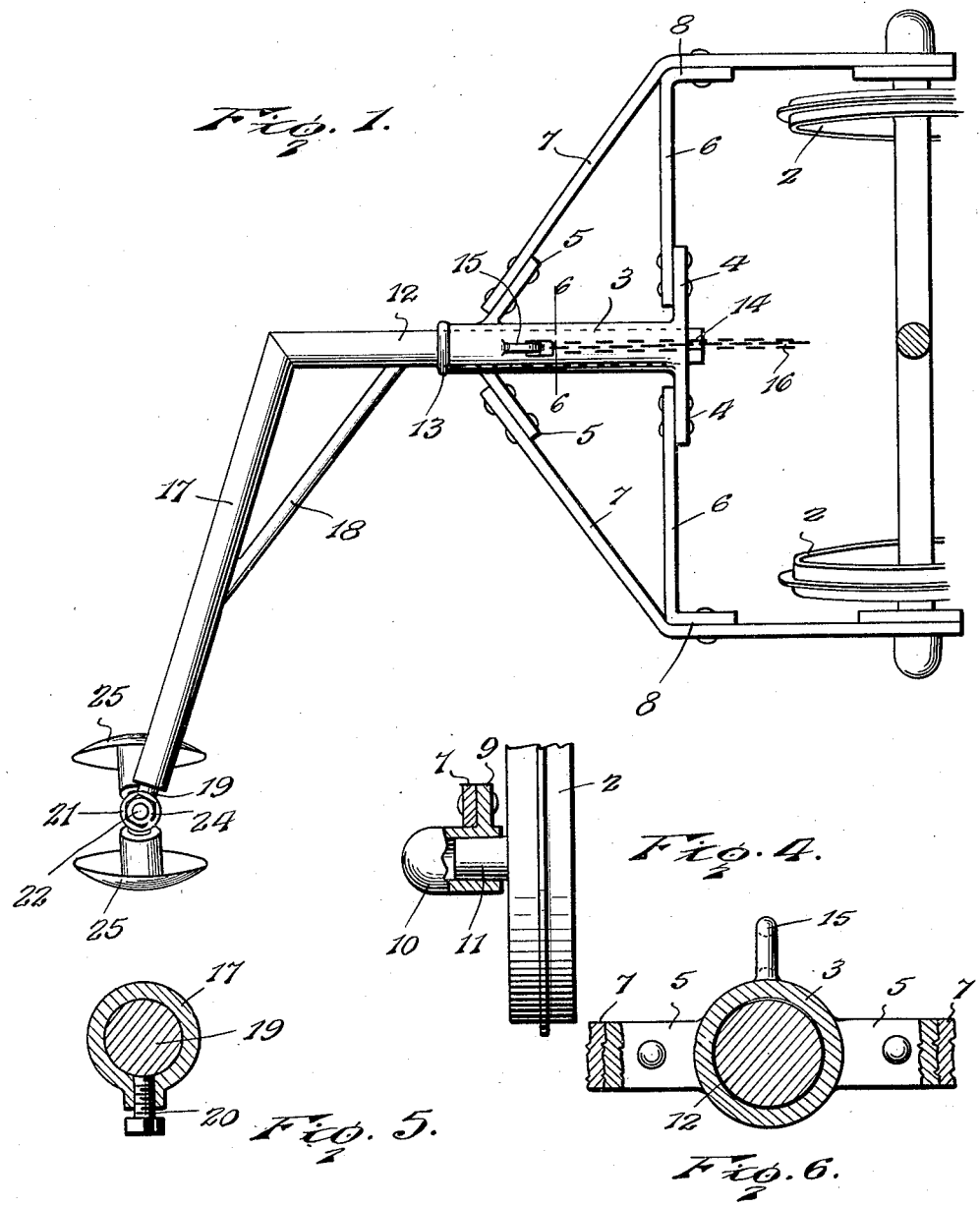
Inventors
L. M. Green.
A. C. Green.
By Lacey & Lacey, Attorneys

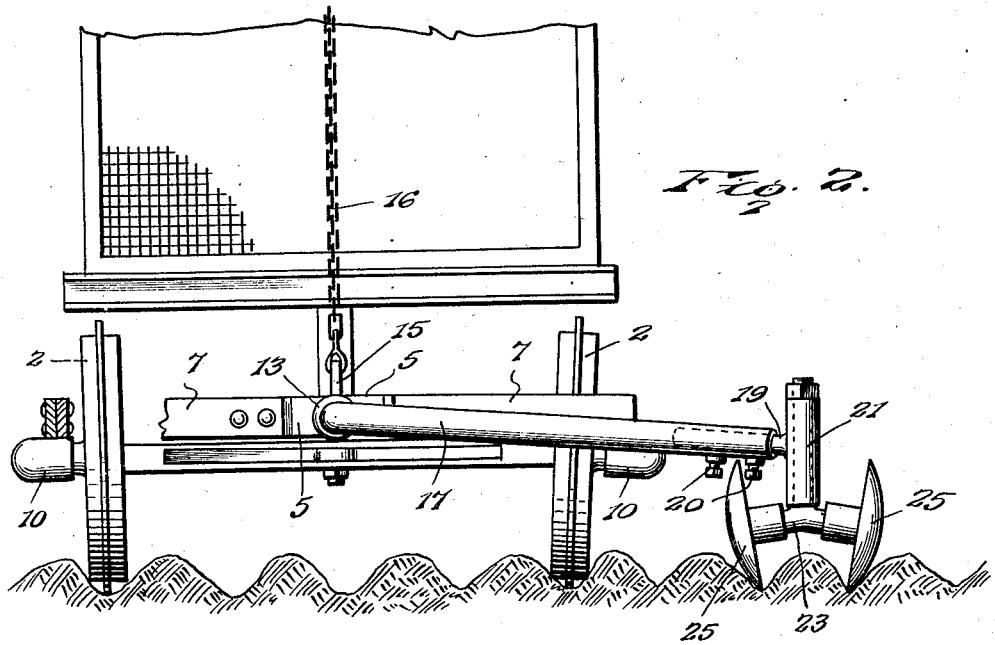
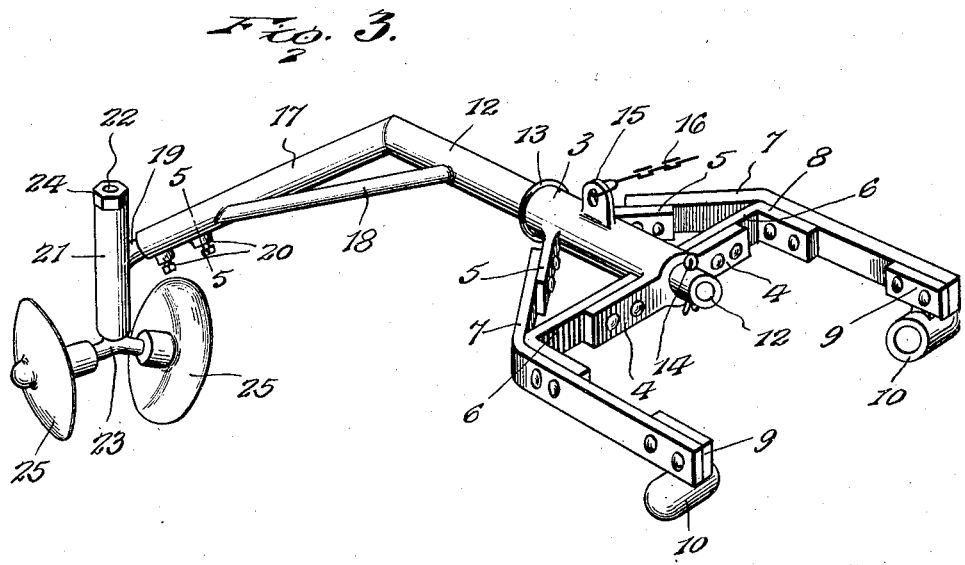

Patented Dec. 22, 1931

1,837,659

UNITED STATES PATENT OFFICE

LIEU M. GREEN AND ARCHIE C. GREEN, OF TEXICO, NEW MEXICO

TRACTOR GUIDE

Application filed July 12, 1930. Serial No. 467,586.

The object of this invention is to provide an attachment for tractors whereby the tractor, when hauling cultivators or plows, may be automatically kept to a path parallel with a previously formed furrow. The invention also seeks to provide a device which may be fitted to the front wheels of the tractor so that as the device follows the irregularities of the furrow it will impart a corresponding movement to the tractor wheels so that the tractor will be steered along a line parallel with the controlling furrow. The invention also has for its object the provision of a novel construction whereby the steering device may be set to run at either side of the tractor and may be easily set to run at a greater or less depth in the furrow as may be desired. Other incidental objects of the invention will appear in the course of the following description, and the invention resides in certain novel features which will be hereinafter first fully described and then more particularly defined in the appended claims.

In the accompanying drawings:

Figure 1 is a plan view of a device embodying the invention showing the application of the same to a tractor.

Fig. 2 is a front elevation of the same,

Fig. 3 is a detail perspective view of the steering device removed from the tractor, Fig. 4 is a detail view showing the tractor wheel in elevation and showing in section the means for attaching the steering device to the wheel, Fig. 5 is a detail section on the line 5—5 of Fig. 3, and Fig. 6 is a detail section on the line 6—6 of Fig. 1.

The tractor, indicated at 1, may be of any known or approved form having the front wheels 2 mounted for pivotal movement relative to the frame of the tractor whereby the tractor may be steered in a well-known manner. In carrying out the present invention, there is provided a frame consisting of a central tube or sleeve 3 having lateral arms 4 at one end and near its opposite end having arms 5 which diverge toward the first-mentioned arms, it being intended that this sleeve or tube, in practice, be disposed in front of the tractor and alined centrally therewith, the arms 4 which extend at a right angle to the axis of the tubular member being at the rear end of the same. Secured to the arms 4 and 5 respectively are bars 6 and 7 which extend laterally and converge to points located in planes parallel with the central longitudinal line of the tractor and at the outer sides of the wheels 2 where said bars are firmly united, as shown at 8, the bars 7 being then extended rearwardly in parallel planes, as clearly shown in Fig. 1. At the rear extremities of the bars 7 are secured brackets 9 which include cups or thimbles 10 adapted to fit over the ends of the spindles or axle carrying the wheels 2, as indicated at 11 in Fig. 4. The drawings show the application of the device to what is popularly referred to as a "narrow-tread" tractor in which the front ground wheels are carried by an axle which turns about a central pivot in steering. Extending through the tubular body 3 and turnable therein is a stem 12 having a shoulder or abutment 13 which is adapted to impinge against the front end of the tubular body and thereby limit the insertion of the stem therethrough, the rear end of the stem being held against withdrawal by a cotter pin 14 or the like in an obvious manner. The sleeve 3 is provided on its upper side with an eye 15 in which may be engaged a chain or other flexible element 16 which may be extended upwardly and engaged over some fixed part of the tractor or a securing device provided thereon whereby to support the frame and the stem in proper position for easy movement or in a raised position where it will be inoperative, it being understood that the cups or thimbles 10 permit the frame to rotate about the hub caps or elements 11 as centers.

The stem 12 is formed at its front end with a lateral arm or branch 17 which is preferably integral therewith and a brace 18 extends across the angle defined by the stem and its branch so as to impart the requisite strength to the structure. The stem and the branch 17 are tubular, as will be understood upon reference to Figs. 3 and 5 more particularly, and in the outer end of the branch 17 is fitted a spindle 19 which is adjustable longitudinally of the branch and may also rotate therein, being held in a set position by set bolts 20 mounted in the under side of the branch and arranged to bear against the spindle, as will be understood upon reference to Fig. 5. The outer end of the spindle 19 carries and is preferably formed integral with a tubular member 21 which receives a spindle 22 having a cross arm 23 at one end and having its opposite end threaded to receive a securing nut 24. Rotatably mounted upon the ends of the cross arm 23 and held thereon in any desired manner are steering disks 25 which are adapted to run in a previously formed furrow, as shown in Fig. 2. The spindle 19 may be rotatably adjusted so that the tubular member 21 will be set in a vertical position or at an angle to the vertical and this adjustment will set the steering disks obviously at higher or lower points so that they will run more or less deeply in the furrow as judgment and experience may indicate to be desirable.

From the foregoing description, taken in connection with the accompanying drawings, it is thought the operation of the apparatus will be readily understood. The steering disks 25 are set to run in a previously formed furrow and will, of course, follow the sinuosity of the furrow as the tractor is driven over the field and the steering wheels consequently pushed along the furrow. Experienced farmers are adept at forming furrows on straight lines, but it is practically impossible to form a furrow along an absolutely straight line and it, therefore, frequently happens that a newly formed furrow will vary in its relation to a previously formed furrow and may diverge therefrom or even cut into the same. With the use of the present apparatus, the steering wheels by running in the previously formed furrow, will hold the tractor and the plows or other implements drawn thereby to paths parallel with the furrow in which the steering disks are engaged. As the steering disks deviate from a straight line, the waving or oscillation thereof will be transmitted through the branch 17 and stem 12 to the frame disposed at the front of the tractor and inasmuch as said frame is fitted directly to the hubs of the tractor steering wheels, said wheels will be shifted in the same manner that they would be shifted if the steering gear were actuated manually by the driver of the tractor. When the tractor and the implement connected therewith have reached the end of the field and are reversed to make a return trip, the steering apparatus may be readily set to engage the last furrow just formed by merely rocking the stem 12 within the tubular member 3 and then adjusting the spindle 9 and the shaft carrying the steering disks. When the plowing operations have been finished, the entire device may be lifted to an inoperative position by properly adjusting the chain or similar element 16 in an obvious manner. The apparatus is exceedingly simple in its construction and arrangement, is not apt to get out of order and is efficient in operation.

Having thus described the invention, we claim:

1. A tractor guide comprising a frame including side bars adapted to lie at the sides of a tractor, means for connecting said bars with the tractor steering wheels whereby movement of the bars will dispose the tractor steering wheels in angular positions, a forwardly projecting tubular body fixed to and carried by said bars centrally of the tractor, a stem extending longitudinally through and rotatable in said tubular member, and furrow-engaging devices carried by said stem.

2. A tractor guide comprising a tubular body, lateral arms on said body at the ends of the same, frame bars secured to said arms and extending laterally and rearwardly therefrom, means at the ends of said bars for connecting the same with the tractor steering wheels, a stem extending longitudinally through and rotatable in said tubular body, and furrow-engaging devices carried by the stem.

3. A tractor guide comprising a frame constructed to be disposed at the front of a tractor, thimbles at the rear ends of said frame adapted to engage upon the hubs of the tractor steering wheels, a stem rotatably fitted in said frame at the center thereof and projecting forwardly therefrom, a tubular branch extending laterally from the front end of said stem, a spindle rotatable and longitudinally adjustable in the outer end of the branch, a tubular member at the outer side of said spindle and disposed at an angle thereto, a shaft fitted in said tubular member, and furrow-engaging devices carried by the lower end of said shaft.

4. A tractor guide comprising a frame constructed to be fitted over the hubs of tractor steering wheels, a stem rotatably mounted in said frame centrally of the same at the front of the tractor, a tubular branch extending from the front end of the stem, a spindle fitted in the outer end of said tubular branch, means for securing said spindle in a set position in the branch, a sleeve carried by the outer end of the spindle, a shaft swiveled in said sleeve and having a cross arm at one end, and furrow-engaging disks rotatably mounted on the ends of said cross arm.

In testimony whereof we affix our signatures.

LIEU M. GREEN. [L. S.]
ARCHIE C. GREEN. [L. S.]